(12) United States Patent
Murdock (10) Patent No.: US 6,396,670 B1
(45) Date of Patent: May 28, 2002

(54) REDUCING SENSOR TEMPERATURE IN MAGNETORESISTIVE RECORDING HEADS

(75) Inventor: Edward S. Murdock, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/600,382

(22) PCT Filed: Jul. 21, 1999

(86) PCT No.: PCT/US99/16571

§ 371 (c)(1),
(2), (4) Date: Jul. 14, 2000

(87) PCT Pub. No.: WO00/05712

PCT Pub. Date: Feb. 3, 2000

Related U.S. Application Data
(60) Provisional application No. 60/093,740, filed on Jul. 21, 1998.

(51) Int. Cl.[7] .............................. G11B 5/39; G11B 5/10
(52) U.S. Cl. ......................................................... 360/319
(58) Field of Search ............................. 360/319, 317, 360/318, 324.1, 325–327, 126

(56) References Cited

U.S. PATENT DOCUMENTS

| | | | |
|---|---|---|---|
| 5,331,493 A | * 7/1994 | Schwarz | 360/313 |
| 5,583,726 A | 12/1996 | Mizoshita et al. | 360/321 |
| 5,644,455 A | * 7/1997 | Schultz | 360/320 |
| 5,654,854 A | 8/1997 | Mallary | 360/327.3 |
| 5,930,086 A | * 7/1999 | Chaug et al. | 360/316 |
| 5,958,612 A | * 9/1999 | Saito et al. | 428/692 |
| 6,216,242 B1 | * 4/2001 | Schaenzer | 714/723 |
| 6,307,720 B1 | * 10/2001 | Hayakawa | 360/313 |

FOREIGN PATENT DOCUMENTS

| | | | |
|---|---|---|---|
| JP | 5-109026 | * | 4/1993 |
| JP | 5-205224 | * | 8/1993 |
| JP | 6-223331 A | | 12/1994 |
| JP | 2000-182226 | * | 6/2000 |

OTHER PUBLICATIONS

Saito et al., "Development of a Magnetoresistive/Inductive Head and Low Noise Amplifier IC for High Density Rigid Disk Drives", IEICE Trans. Fundamentals, vol. E76–A, No1. 7, Jul. 1993.

* cited by examiner

Primary Examiner—Jefferson Evans
(74) Attorney, Agent, or Firm—Fish & Richardson P.C.

(57) ABSTRACT

A method and apparatus for dissipating heat generated in a sensor element of a vertical magnetoresistive recording head or flux guide magnetoresistive recording head having a recess formed in the lower and/or upper magnetic shields for enhancing efficiency during reading data from a magnetic medium. Heat is dissipated through a non-magnetic metal filler layer (10, 12) formed in the shield recesses (140) between an upper (2) or lower (6) metal shield and a sensor element (4) comprising a magnetoresistive head structure. The metal filler (10, 12) must be non-magnetic, must avoid an electrical short between the sensor element and the upper (2) or lower (6) magnetic shield, and must be compatible with the adjacent shield in terms of adhesion thereto and the thermal expansion coefficient thereof. An insulator layer (11, 20) comprising an electrical insulator is formed between the sensor element (4) and the metal filler (10, 12) to insure electrical insulation. The metal filler (10, 12) acts as a thermal path from the sensor element (4) to the metal shields (2, 6).

20 Claims, 6 Drawing Sheets

REDUCING SENSOR TEMPERATURE IN MAGNETORESISTIVE RECORDING HEADS

This application is a 371 of PCT/US99/16571 filed Jul. 9, 1999 which claims benefit of Prov. No. 60/093,740 filed Jul. 21, 1998.

BACKGROUND OF THE INVENTION

Magnetoresistive recording heads are well known to be useful in reading back data from a magnetic media mass storage devices such as disk drives or magnetic tape drives. Popular designs include a standard giant magnetoresistive (GMR), vertical giant magnetoresistive (VGMR), advanced magnetic (AMR), vertical advanced magnetic recording (VAMR), and spin valve type heads. Typically, a magnetic read back sensor is used to detect a direction and amount of magnetic flux as a magnetic media passes by in close proximity to the sensor. This sensor is biased by a current which changes in direction and magnitude in the presence of a magnetic flux. Changes in magnetic field signals are sensed by the bias current and are correlated to meaningful data by a data processing device with access to the magnetic media mass storage device.

Figure 1A:
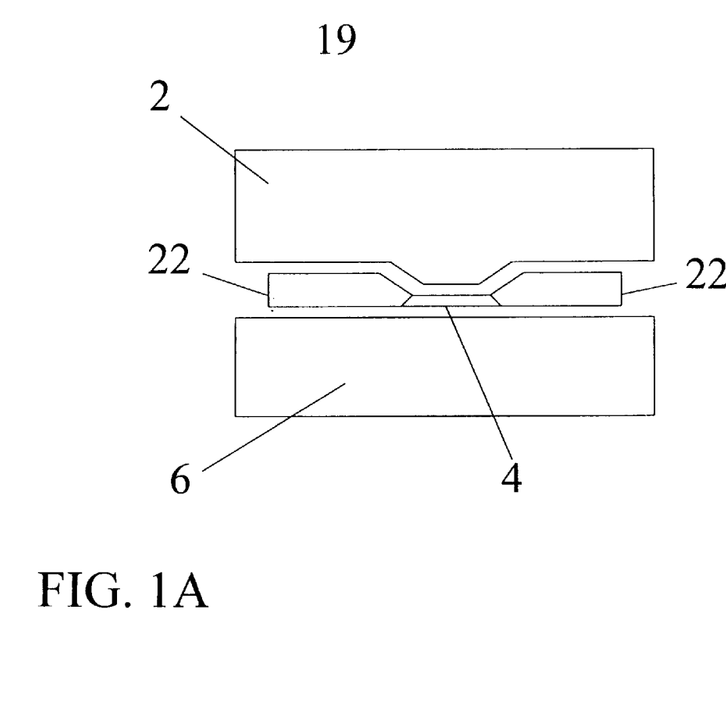
FIG. 1A illustrates cross section and an air bearing view of a standard AMR or Spin Valve head.

A basic design of a standard AMR or spin valve head (FIG. 1A) includes a sensor element 4 adjacent to an air bearing surface ("ABS") 8 with electrical contacts 22 touching the sides of the sensor 4. The sensor 4 lies between upper and lower shields 2, 6.

In contrast, a basic design of a vertical GMR head (FIG. 1B) includes a sensor element 4 comprising a front contact 9 adjacent to an ABS 8, an optional bias winding 3 and a rear contact 5. The vertical GMR sensor element 4 runs away from the ABS 8 between the front and rear contacts 9 and 5. An upper metal shield 2 and a lower metal shield 6 surround the sensor element 4 and bias winding 3. The lower recessed region 21 is optional, but is known to improve the magnetic efficiency of the device. Another design generally referred to as flux guide heads (FIG. 2), comprises two contacts 14 between a front flux guide 16 and a rear flux guide 15. The flux guides 15, 16 are bounded by an upper metal shield 2 and a lower metal shield 6.

A problem that is encountered in all AMR and GMR heads, including vertical GMR and Flux Guide heads is the heating of the sensor element due to Joule heating from the bias current. Joule heating is the resultant heating on matter in which current flows from energy loss due to electron-ion collisions. The resultant power loss is:

$$P = I_b^2 R_{se},$$

where $I_b$ is the bias current through the sensor element and $R_{se}$ is the resistance of the sensor element. In the case of most standard AMR and GMR-spin valve type heads, much of the Joule heat is removed from the sensor via direct thermal conduction to metal shields through two half-gap insulators 19, 21, 23. Half-gap insulator refers to the insulators between the MR/GMR element and the lower/upper shield respectively. The gap is the distance between the two shields. Normally, the insulator material is $Al_2O_3$, or any pin-hole free dielectric with an adequately high breakdown voltage, such as AlN, $Si_3N_4$, $SiO_2$, or diamond-like carbon (DLC). These half gap insulators 19, 21, 23 can comprise a low thermal conductivity thermal path 7 (the width of the half-gap insulator regions 21, 23) of typically 100 Angstroms or more, that can significantly limit heat dissipation. Some cooling is realized by thermal radiation and convective cooling from the ABS 8 adjacent to the front sensor of the head to the recording medium as well as heat conduction out to the sides through the contacts 22. However, performance and reliability of the head are limited by the temperature increase resulting from normal use of the sensor. In general, the head reliability decreases as it heats due to accelerated interdiffusion of GMR film layers. The result of overheating can have results ranging from signal loss to melting of the heads.

Vertical AMR and Vertical GMR read back heads experience even more severe Joule heating of the sensor. For optimum magnetic efficiency and high signal output, shield recesses 21, 23 (FIG. 1B) are necessary. This design, however, increases the thermal paths 7. As a result, the rate of heat extraction from the sensor 4 is reduced and the sensor 4 operates hotter than if there were no shield recesses. Because the sensor 4 is longer than a standard GMR sensor and has consequently higher resistance, the VGMR sensor with recessed shields will also operate hotter than a standard horizontal GMR sensor. In a typical vertical GMR design, a front contact 9 is sided by an upper metal shield 2 and lower metal shield 6 adjacent area comprising an ABS 8. The part of the sensor 4 and front contact 9 that are adjacent to the ABS 8 are separated from the shields 2, 6 by front half gaps 19. A bias winding 3, if present (it is optional), is set back from the front contact 9 and sided by the upper and lower metal shields 2, 6. A rear contact 5 may extend beyond the metal shields 2, 6 and is connected to the front contact 9 via a vertical giant magnetoresistive sensor ("VGMR") 4 that runs adjacent to the bias winding 3 and perpendicular to the ABS 8. The recessed design causes the upper recessed metal shield 2 and lower recessed metal shield 6 to be spaced at a relatively large distance away from the sensor element 4, separated by the recessed gap insulators 21 and 23.

Figure 1B:
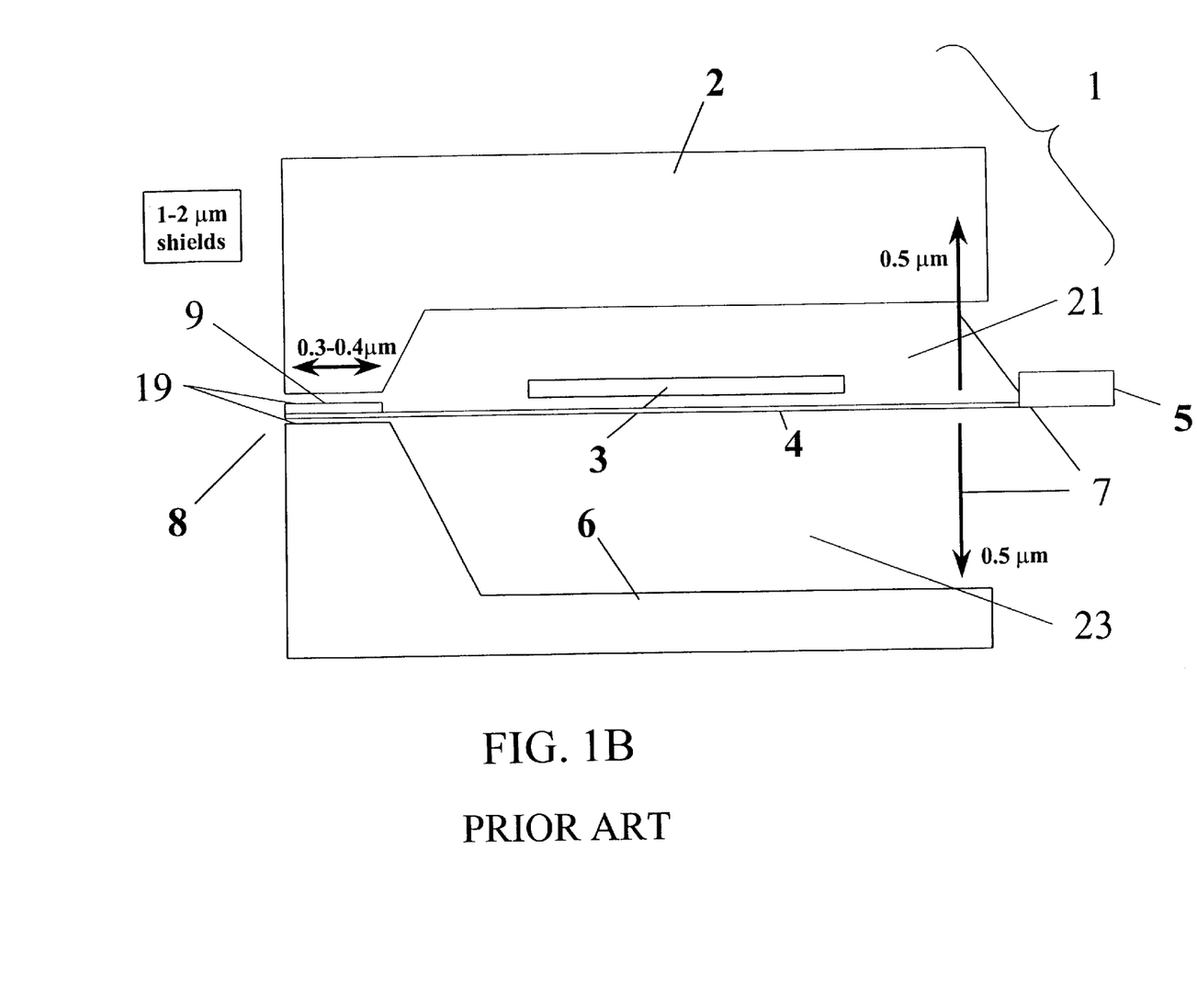
FIG. 1B illustrates a cross section of a typical design of a Vertical Giant Magnetoresistive Head.
Figure 2:
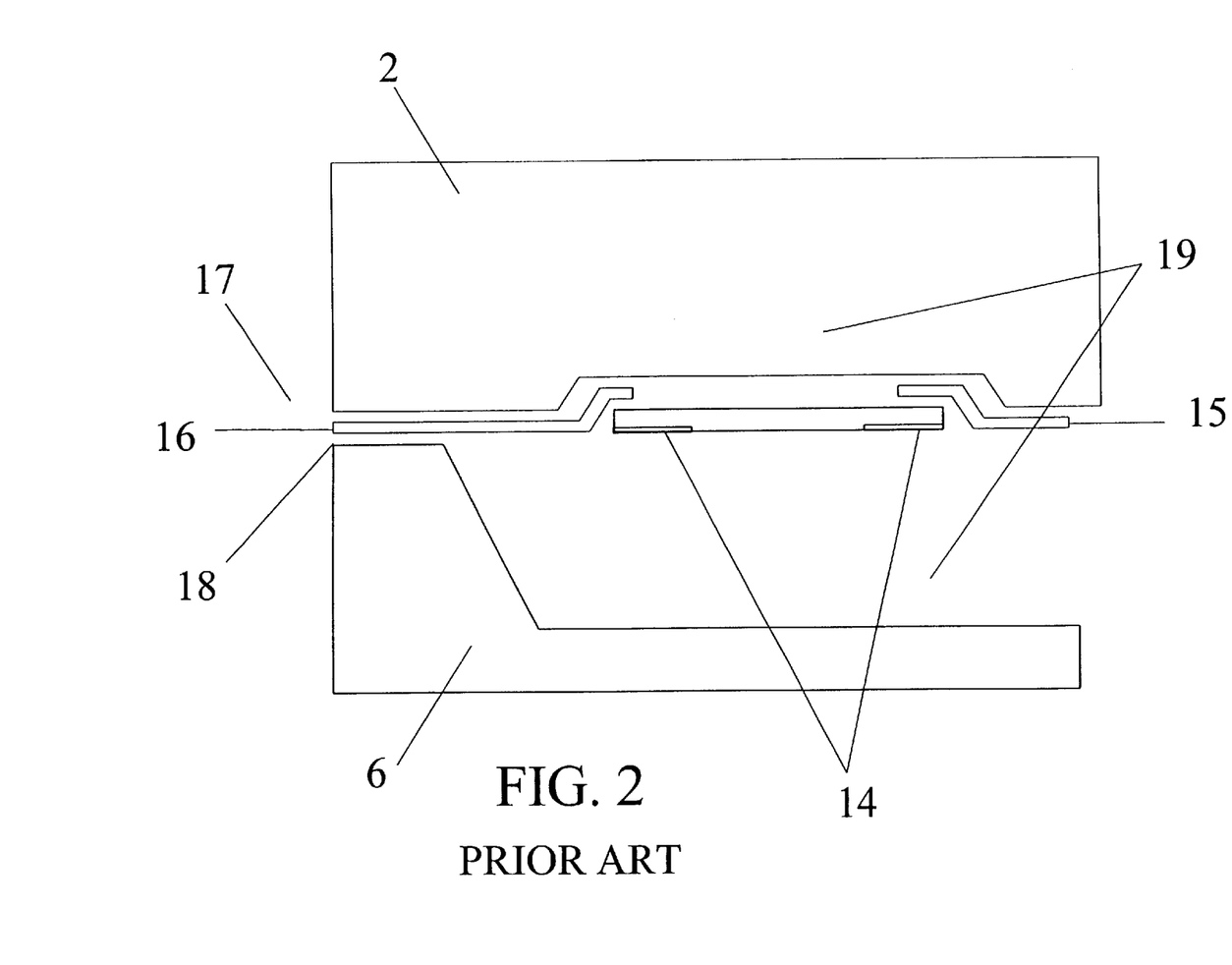
FIG. 2 illustrates a cross section of a typical design of a Flux Guide Head.

Whereas if the metal shields 2, 6 were located in close proximity to the sensor, the shields could act as effective heat sinks, instead the shields are recessed, forming an increased area that is filled with a gap insulator 21, 23 that inhibits heat dissipation. The vertical design also positions the heat-producing part of the element 4 including the bias winding 3 such that it is not exposed at the ABS 8 where it can radiate heat away.

VGMR heads are designed so that they have a much wider sensor-to-shield gap 7 in the region away from the ABS 8 in relation to the sensor-to-shield air gap 19 in close proximity to the ABS 8. This wider gap 7 inhibits the inherent role of heat dissipater that the metal shields 2, 6 would otherwise perform.

The wider gap from sensor to shield incorporated into the VGMR design is necessary to address considerations of magnetic flux propagation. In order to limit flux propagation, the VGMR type designs typically require that both the upper and lower metal shields be recessed to improve magnetic efficiency. The recess is required to ensure that magnetic flux from the media reaches the sensitive part of the VGMR sensor. The sensitive part, covered by the front contact 9, generates no signal. Without recesses that start at the top of front contact 9, all the flux leaks from the two shields 2, 6 and lowers the signal output.

As a result, the buried portion of the sensor that lies within the wider gap 21, 23 experiences more heat buildup than the sensor portion in the narrow gap 19. The heat buildup is a direct result of the lessened thermal conductivity of the gap insulators 21, 23 as compared to the metal shields 2, 6. The larger gap 21, 23 between the sensor 4 and the heat sinking metal shields 2, 6 results in a correspondingly longer thermal path 7 for removing a sensor's heat before the heat reaches the thermal sink of the shields 2, 6.

SUMMARY OF THE INVENTION

Accordingly this invention provides a method and apparatus for improved heat dissipation in a magnetoresistive recording head. Heat dissipation is improved by inclusion of a high thermal conductivity metal as a metal filler located between an upper and a lower metal shield and a sensor. A highly thermally conductive material might include an element metal such as aluminum or copper and should be specifically tailored to have a similar thermal expansion coefficient as the shield material. Moreover, the metal filler must be non-magnetic. In addition, to facilitate the magnetic efficiency of the head, recesses in the upper and lower shields are used.

One condition adding to the heating problem of the buried sensor is the long low thermal conductivity heat path between a sensor acting as a heat source and the upper and lower metal shields acting as a heat sink. However, there is no intrinsic functional reason why a recessed region generally comprising this long thermal path must be filled with an insulator. Functionally, only three requirements must be met. First, a recessed gap must be non-magnetic. Second, there must not be an electrical short circuit between the sensor element and either an upper or lower metal shield. Third, the material filling a recess must be compatible with a shield and overall head structure in terms of adhesion to the shield and the thermal expansion coefficient of the shield. A significant disparity in the thermal coefficient between a metal shield and filler material could result in stress and possibly cause separation of the layers, or distortion to the VGMR head.

This invention teaches removal of heat generated in a sensor in a magnetic head by use of a heat dissipating device comprising a high thermal conductivity metal, such as a transition metal. The high thermal conductivity metal should be tailored to have a similar thermal expansion coefficient as the shield materials and positioned in close proximity to the sensor but not in electrical contact. This metal but non-magnetic filler provides a thermally conductive path to the shields acting as heat sinks. In addition a metal but non-magnetic filler provides increased heat dissipation through its own thermal mass.

Other advantages and features of the present invention will become apparent from the following description, including the drawings and the claims.

BRIEF DESCRIPTION OF THE DRAWINGS

The aforementioned and other features and objects of this invention and the manner of attaining them will become more apparent and the invention itself will be best understood by reference to the following description of a preferred embodiment taken in conjunction with the accompanying drawings, wherein.

DETAILED DESCRIPTION

The following detailed description makes reference to the accompanying drawings which form a part hereof and show by way of illustration a specific embodiment in which the invention may be practiced. This embodiment is described in sufficient detail to enable those skilled in the art to practice the invention. It is to be understood that other embodiments may be utilized and that structural changes may be made without departing from the scope of the invention. The following detailed description is therefore not to be taken in a limiting sense and the scope of the present invention is defined by the appended claims.

Figure 3:
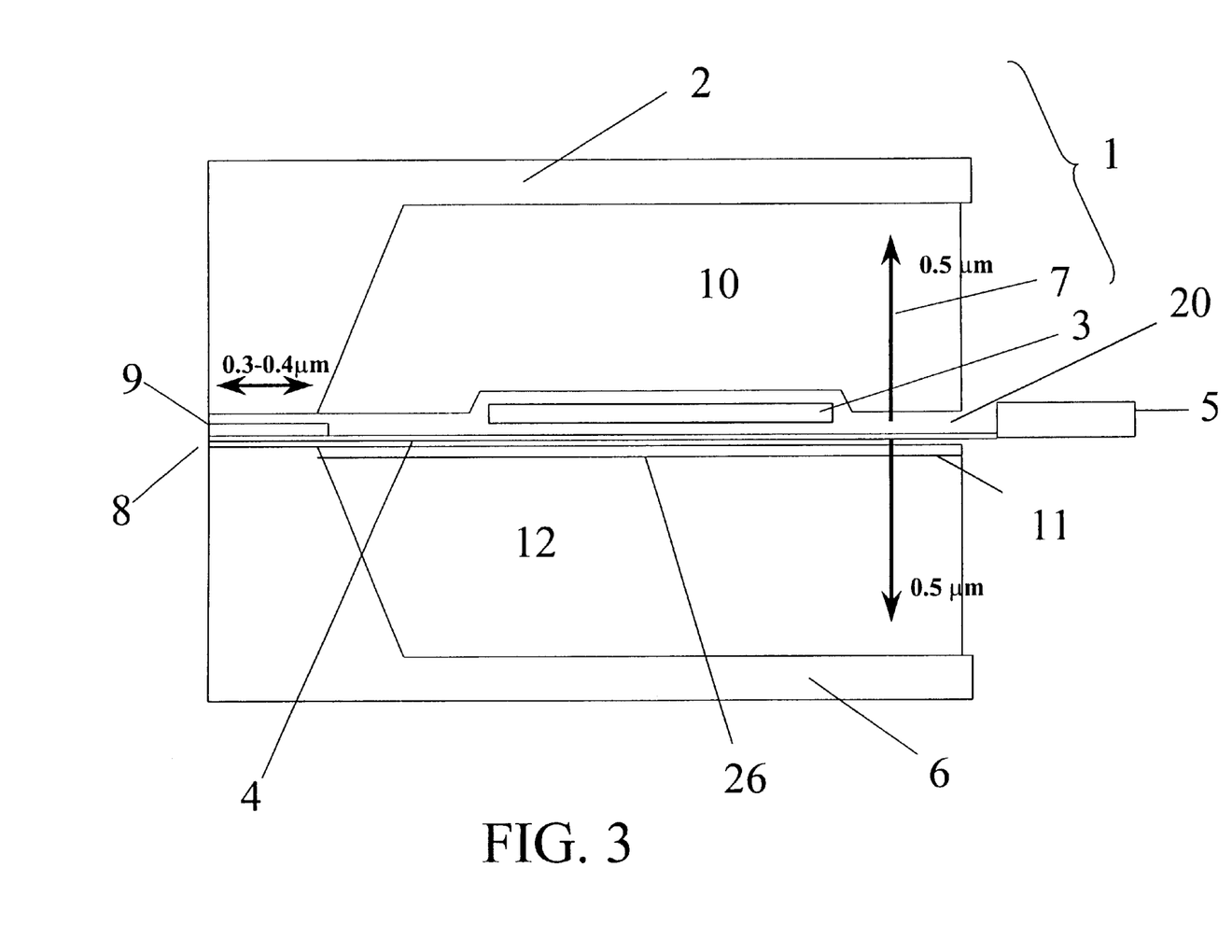
FIG. 3 illustrates a cross section of a Vertical Giant Magnetoresistive Head with a recessed upper shield, an upper metal filler and a lower metal filler providing shortened thermal paths for sensor heat dissipation.
Figure 3A:
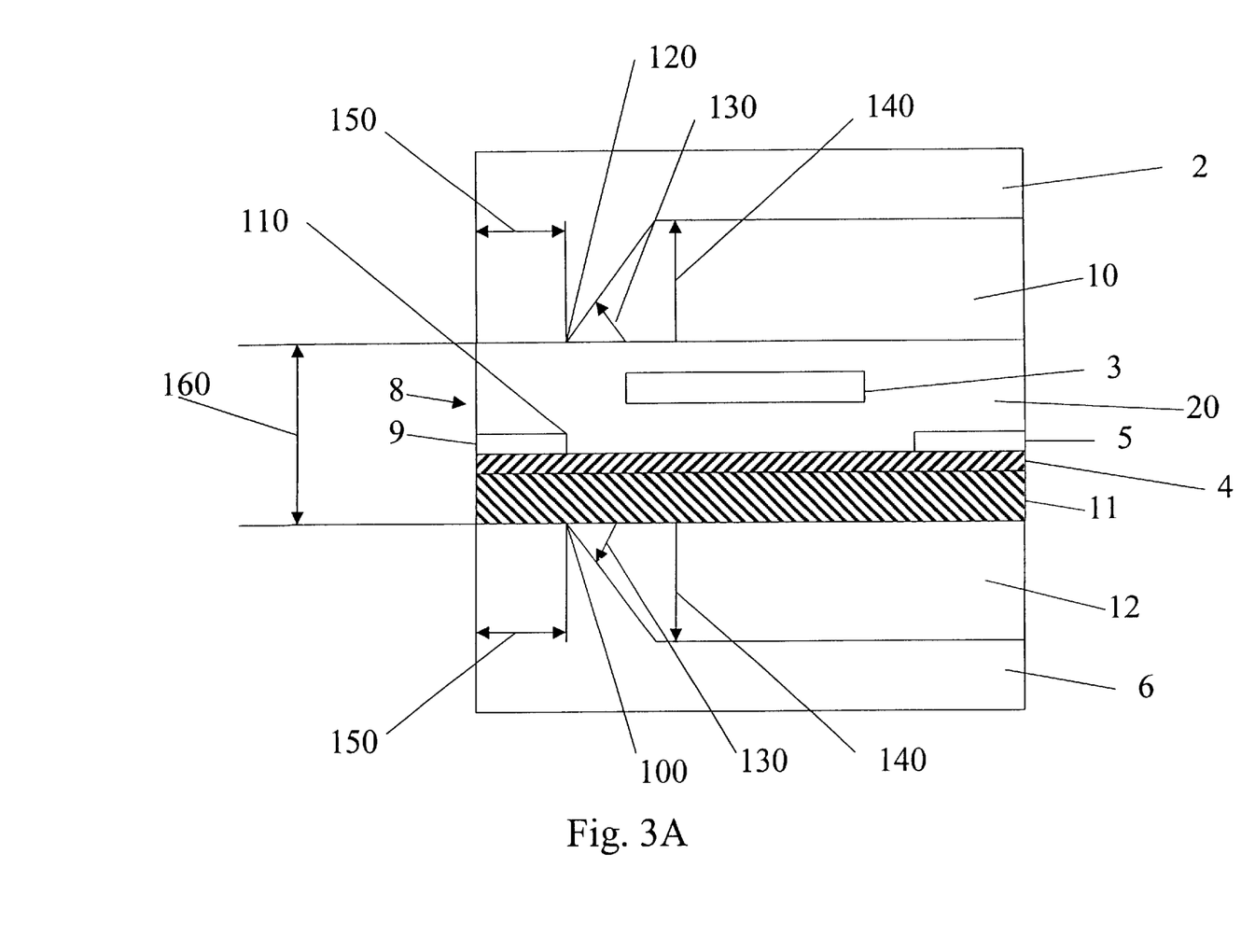
FIG. 3A illustrates a cross section of s Vertical Giant Magnetoresistive Head.

With reference now to FIG. 3 which illustrates an implementation of this invention, a vertical giant magnetoresistive (VGMR) head 1 is shown. The VGMR comprises, in pertinent part, a lower magnetic metal shield 6. The lower metal shield 6 can be comprised of an alloy such as Permalloy, a nickel iron alloy, or other well known electrically and thermally conductive magnetic alloy. The lower shield 6 acts a thermal sink for heat generated by a sensor 4 and optional bias winding 3. The lower shield 6 also acts as a magnetic shield for the read sensor 4. With reference now to FIG. 3A, an embodiment of a VGMR sensor is shown to illustrate details of the upper and lower shields 2, 6. The upper and lower shields 2, 6 are constructed with recesses 140. The magnetic material comprising the shields 2, 6 is so constructed that beginning at corners 100 and 120 respectively the spaces, containing filler 10 and 12, between the shields 2, 6 and the sensor 4 is rapidly increased compared to the thickness of the lower and upper half gap insulators 11 and 20 respectively. The angle 130 at which the recess opens is preferably in the range of 60–90 degrees. The depth of the recesses 140, is in the range of 10.2–1.0 microns and is preferably approximately 0.5 microns. The purpose of the recesses 140 is to increase the efficiency of the magnetic sensor 4. The recesses 140 increase the amount of magnetic flux in the active part of the sensor 4 between the upper edge 110 of the front contact 9 and the rear contact 5. For proper operation, the recess corners 100, 120 and the upper edge 110 of the front contact 9 should all three be mutually aligned within less than about 0.2 microns. The thickness of a "lip" 150, formed in the two magnetic shields 2, 6, between the recesses 140 and the ABS 8 must be less than 0.5 microns and is preferably about 2–3 times the distance of the shield to shield gap 160. For example, if the gap 160 is 0.10 microns, then the lip 150 is preferably 0.2–0.3 microns.

Referring to FIGS. 3 and 3A, formed on top of the lower metal shield 6 by way of industry standard deposition techniques such as electroplating, or RF or DC sputtering, is a lower metal filler layer 12 comprising a nonmagnetic high thermal conductivity metal. In an embodiment, the lower metal filler 12 comprises a transition metal such as aluminum, copper, or gold. Pure elements generally provide better thermal conductivity. However, an alloy (e.g., Al—Cu) may be added in order to match the thermal expansion coefficient with the shields 2, 6. An ultra-high-thermal conductivity dielectric such as diamond or diamond-like carbon (DLC) could also be used. The lower metal filler 12 should have a thermal expansion coefficient that is matched with the thermal expansion coefficient of the lower metal shield 6. Thermal expansion coefficients of the lower metal shield 6 and the lower metal filler 12 need to be matched so that as heat dissipates through the lower metal filler layer 12 to the lower metal shield 6 which acts as a thermal sink. The thermal expansion coefficients of the lower metal shield 6 and the lower metal filler 12 also need to be matched so that during the other head fabrication processes the lower metal filler layer 12 does not separate from the lower metal shield 6 or otherwise distort due to differential thermal expansion.

In an embodiment, the lower metal filler layer 12 is planarized along an upper surface of the lower metal filler layer 12. One of the purposes of the polishing is to prevent a ridge or trench at the boundary between the shields 2, 6 and the filler 10, 12 at points 120 and 100 respectively. The planarization can be accomplished by any known practice in the industry, such as chemical mechanical polishing. Planarization is useful in preparing for a subsequent deposition of a sensor element 4. Between the lower metal filler layer 12 and the sensor element 4, a lower insulator layer 11, also called the first half gap, must be formed. This lower insulator layer 11 electrically insulates the sensor element from the lower metal filler 12 layer and the lower metal shield 6. The lower insulator layer 11 can comprise a dielectric material such as aluminum oxide, aluminum nitride or silicon nitride. In addition, the lower insulator layer 11 can comprise diamond-like carbon or other materials that provide thermal conduction and are non-magnetic. They can be deposited using standard deposition techniques. In an embodiment, the surface of the lower metal filler 12 may be oxidized to form an insulator layer 26. For example, a lower metal filler 12 may comprise aluminum, the surface of which can be oxidized to form a layer 26 of aluminum oxide prior to deposition of the normal power insulator layer first half gap. An aluminum oxide surface layer can serve as a lower insulator layer 11.

A sensor element 4 is formed on top of the lower insulator layer 11. In an embodiment, the sensor element 4 is deposited using sputter deposition. However, other means conducive to the manufacture of the head can also be utilized. An upper insulation layer 20 is formed on top of the sensor element 4. Preferably the upper insulation layer 20 comprises the same material as the lower insulation layer 11. However, other materials providing required electrically insulating properties may be used, such as a dielectric, aluminum nitride, silicon nitride, silicon dioxide or DLC. An optional bias winding 3 can be patterned into the upper layer insulation layer 20. Patterning can be accomplished via photolithography. The bias winding 3 can be deposited by sputtering, plating, or other known manufacturing means.

An upper metal filler layer 10 is deposited over the upper insulation layer 20 forming a magnetically recessed region 10 in the upper magnetic shield 2. The upper metal filler layer 10 is similar to the lower metal filler layer 12 in that it comprises a nonmagnetic, high-thermally-conductivity material. In an embodiment, the upper metal filler 10 also comprises an element metal such as aluminum, copper, or gold. Diamond or DLC may also be used, but is not preferred. The upper metal filler 10 should have a thermal expansion coefficient that is matched with the thermal expansion coefficient of an upper metal shield 2 that is formed over the upper metal filler 10. Thermal expansion coefficients of the upper metal filler and upper metal shield 2 need to be sufficiently close so that heat dissipation through the metal filler to the metal shield which acts as a thermal sink, does not separate the upper metal filler 10 from the metal shield 2 or otherwise distort the head.

The upper metal shield 2 like the lower metal shield 6 is comprised of a magnetic alloy such as Permalloy, a nickel iron alloy, or other well known electrical and thermally conductive alloy with magnetic properties. The upper shield 2 acts as an upper thermal sink to heat generated by the sensor 4 and bias winding 3.

In an embodiment, the metal filler layers 10, 12 are between 0.2 $\mu$m and 1.0 $\mu$m thick but preferably about 0.5 $\mu$m thick. The metal filler 10, 12 layers serve as conductors of heat to the thermal sinks comprising the metal shields 2, 6. The metal fillers 10, 12 should be in electrical and thermal contact with the metal shields 2, 6, but electrically insulated from the sensor 4.

Figure 4:
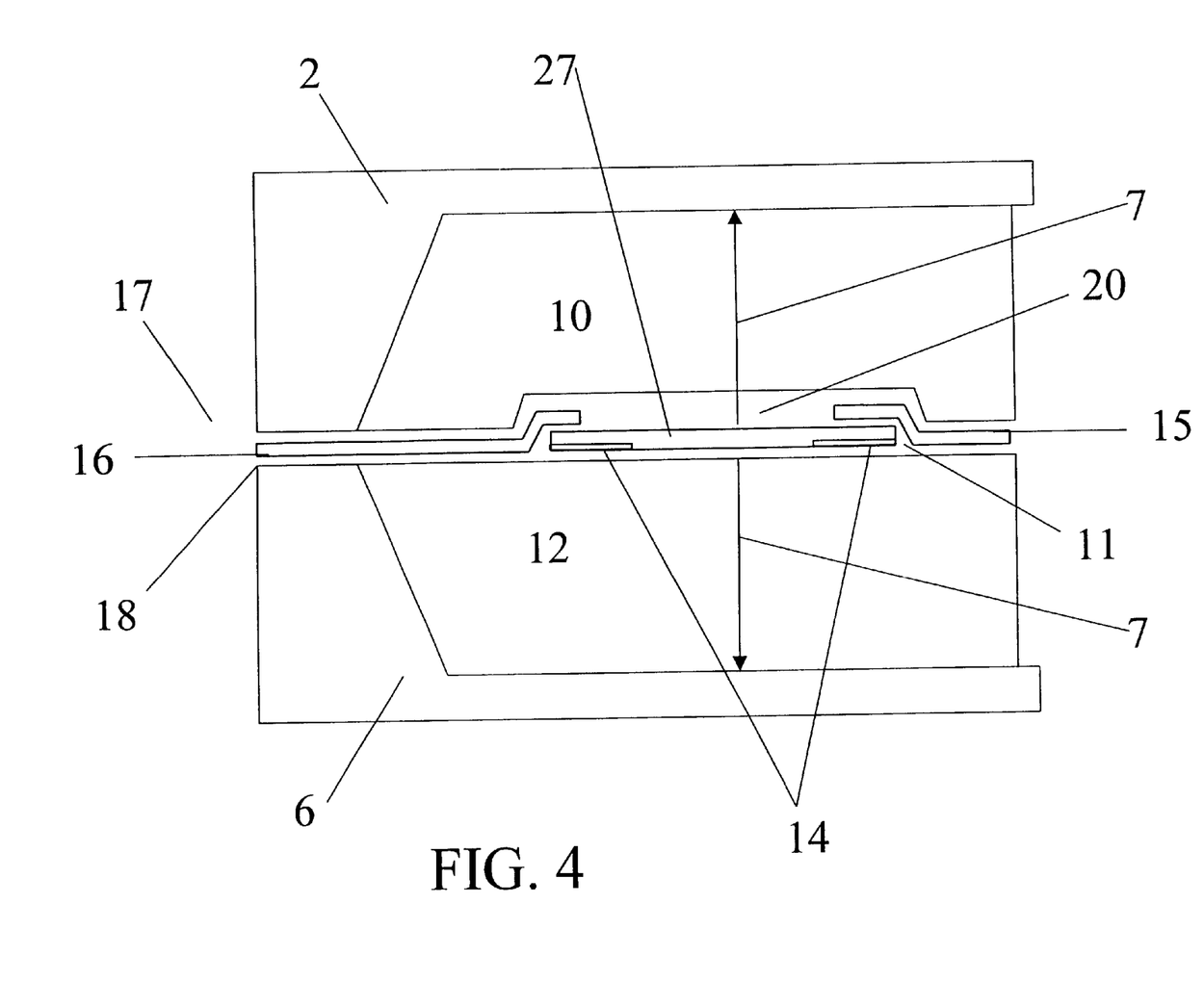
FIG. 4 illustrates a cross section of a Flux Guide Head with an upper metal filler and a lower metal filler providing shortened thermal paths for sensor heat dissipation.

With reference now to FIG. 4, which illustrates another embodiment, a flux guide head with thermal fillers 10, 12 is shown. Similar to the VGMR head discussed above, the flux guide head has a lower metal shield 6 with recessed volume, a lower metal filler 12 formed on the lower metal shield 6 within the recessed volume, and a lower insulator layer 11 formed on the surface of the lower metal filler layer 12. These elements included in the flux guide head comprise the same characteristics as those disclosed above for the VGMR head above.

Additionally, the flux guide head comprises head contacts 14 deposited onto the lower insulator layer 12 and the flux guided magnetic sensor element 27 connecting the contacts 14. The head contacts 14 are bordered by a rear flux guide 15 and a front flux guide 16. The flux guides 15, 16 can be patterned onto the lower insulation layer 12 by means of photolithography. Formed above the head contacts 14 and flux guides 15, 16 is an upper insulation layer 20; and upper metal filler 10 forming a magnetic recess in the upper magnetic shield 2 of similar description to those same discussed above for the VGMR head.

The flux guide head illustrates another embodiment which comprises a device and method for dissipating heat from a sensor element by means of a metal filler formed adjacent to a metal shield and placed in close proximity to a heat generating sensor element. This invention provides for thermal conductivity across the relatively long thermal path 7 from the sensor element to the heat dissipating metal shields 2 and 6.

This invention can be practiced in any head structure having an active, current carrying magnetic sensor of which part, or all, of the sensor resides between magnetic shields such that conduction of heat from the sensor to the shields via a gap insulator benefits from being optimized. This invention may be used for example, but not limited to, vertical advanced magnetic recording heads, giant magnetoresistive recording heads, horizontal spin valve readers with recessed gaps, or tape heads in which a flux guide is used to convey magnetic flux from the tape bearing surface to a buried sensor.

Other embodiments are within the scope of the following claims.

What is claimed is:

1. A device for dissipating heat from a magnetic head sensor comprising:
   a metal shield having a recess;
   a thermally conductive metal filler layer formed adjacent to said metal shield, within said recess, and in close proximity to a sensor element; and
   an electrically insulating layer formed between said thermally conductive metal filler and the sensor element.

2. The device for dissipating heat of claim 1 wherein the metal shield is comprised of a nickel iron alloy.

3. The device for dissipating heat of claim 1 wherein the thermally conductive metal filler layer is at least one of aluminum, copper, gold, a thermally conductive alloy, and diamond-like carbon.

4. The device for dissipating heat of claim 1 wherein the thermally conductive metal filler is planarized along an upper surface.

5. The device for dissipating heat of claim 1 wherein the electrically insulating layer comprises a dielectric material.

6. The device for dissipating heat of claim 1 wherein the electrically insulating layer comprises at least one of aluminum oxide, silicon oxide, silicon nitride, and aluminum nitride.

7. The device for dissipating heat of claim 1 wherein the magnetic head sensor is sputter deposited on the electrically insulating layer.

8. The device for dissipating heat of claim 1 wherein the thermally conductive metal filler comprises aluminum, and an upper surface of said aluminum filler is oxidized to form the electrically insulating layer.

9. The device for dissipating heat of claim 1 wherein the electrically insulating layer comprises aluminum oxide.

10. A device for dissipating heat from a magnetic head sensor comprising:
    an upper metal shield having an upper recess and lower metal shield having a lower recess;
    a thermally conductive lower metal filler layer formed adjacent to said lower metal shield within said lower recess;
    a lower electrically insulating layer formed between said lower thermally conductive lower metal filler layer and a sensor element; and
    an upper electrically insulating layer formed between said sensor element and a thermally conductive upper metal filler layer, said upper metal filler layer being adjacent to said upper metal shield within said upper recess.

11. The device for dissipating heat from a magnetic head sensor of claim 10 wherein the upper metal filler layer and the lower metal filler layer comprise the same material.

12. The device for dissipating heat from a magnetic head sensor of claim 10 wherein the upper metal filler layer and the lower metal filler layer consist of at least one of aluminum, copper, gold, a thermally conductive alloy, and diamond-like carbon.

13. The device for dissipating heat of claim 10 wherein the thermally conductive lower metal filler is planarized along an upper surface.

14. A method for dissipating heat from a magnetic head sensor comprising:
    providing a metal shield with a recess;
    forming a thermally conductive metal filler layer adjacent to said metal shield within said recess and in close proximity to a sensor element; and
    forming an electrically insulating layer between said thermally conductive metal filler and the magnetic head sensor.

15. The method for dissipating heat from a magnetic head sensor of claim 14 wherein the metal shield is comprised of a nickel iron alloy.

16. The method for dissipating heat from a magnetic head sensor of claim 14 wherein the thermally conductive metal filler layer is at least one of aluminum, copper and gold.

17. The method for dissipating heat from a magnetic head sensor of claim 14 wherein the thermally conductive metal filler is planarized along an upper surface.

18. The method for dissipating heat from a magnetic head sensor of claim 14 wherein the electrically insulating layer comprises a dielectric metal.

19. The method for dissipating heat from a magnetic head sensor of claim 14 wherein the magnetic head sensor is sputter deposited on the electrically insulating layer.

20. An apparatus for dissipating heat from a magnetic head sensor comprising:
    an upper metal shield and a lower metal shield;
    a sensor element located between said metal shields;
    a nonmagnetic means for conducting heat from said sensor to said metal shields; and
    an insulating means for electrically insulating said nonmagnetic means for conducting heat from said sensor.

* * * * *